UNITED STATES PATENT OFFICE.

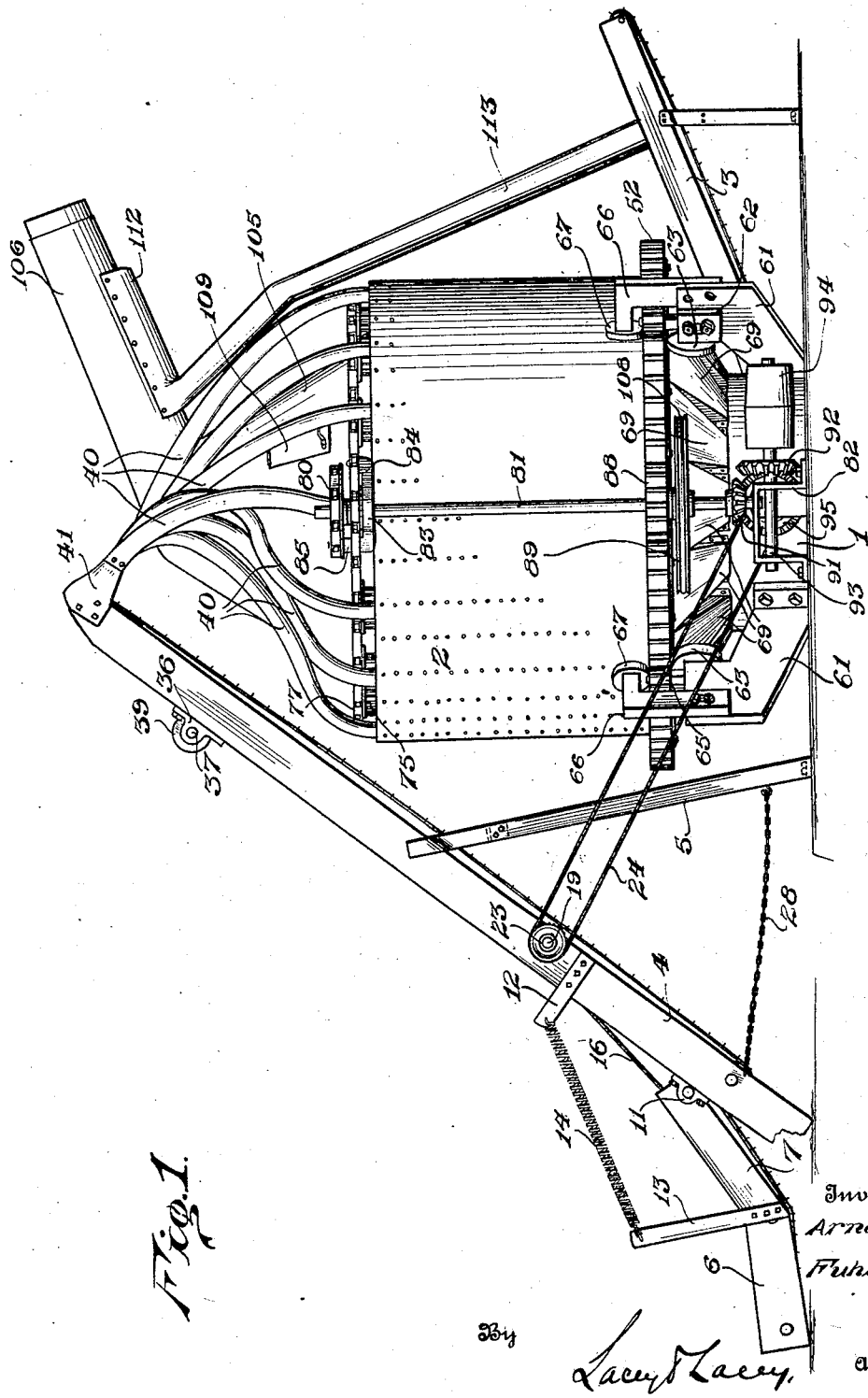

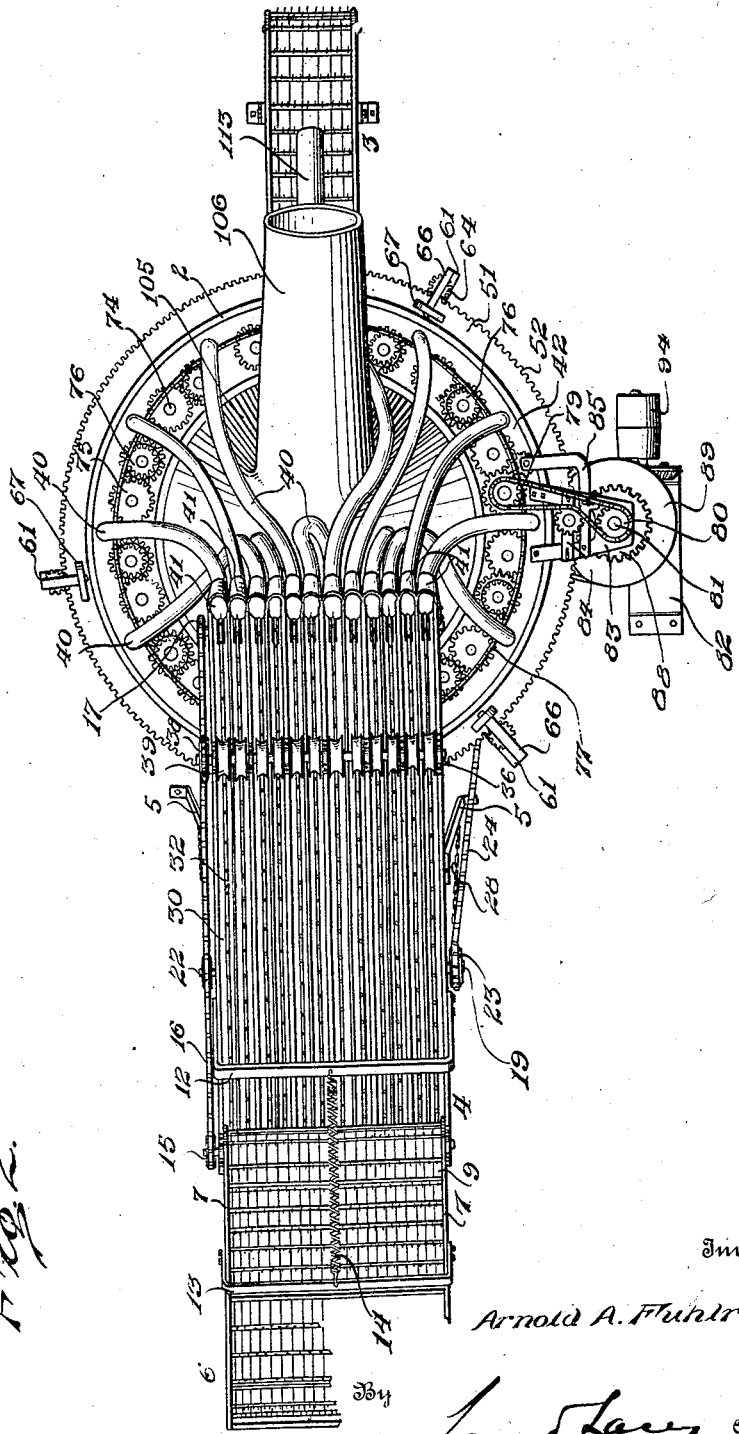

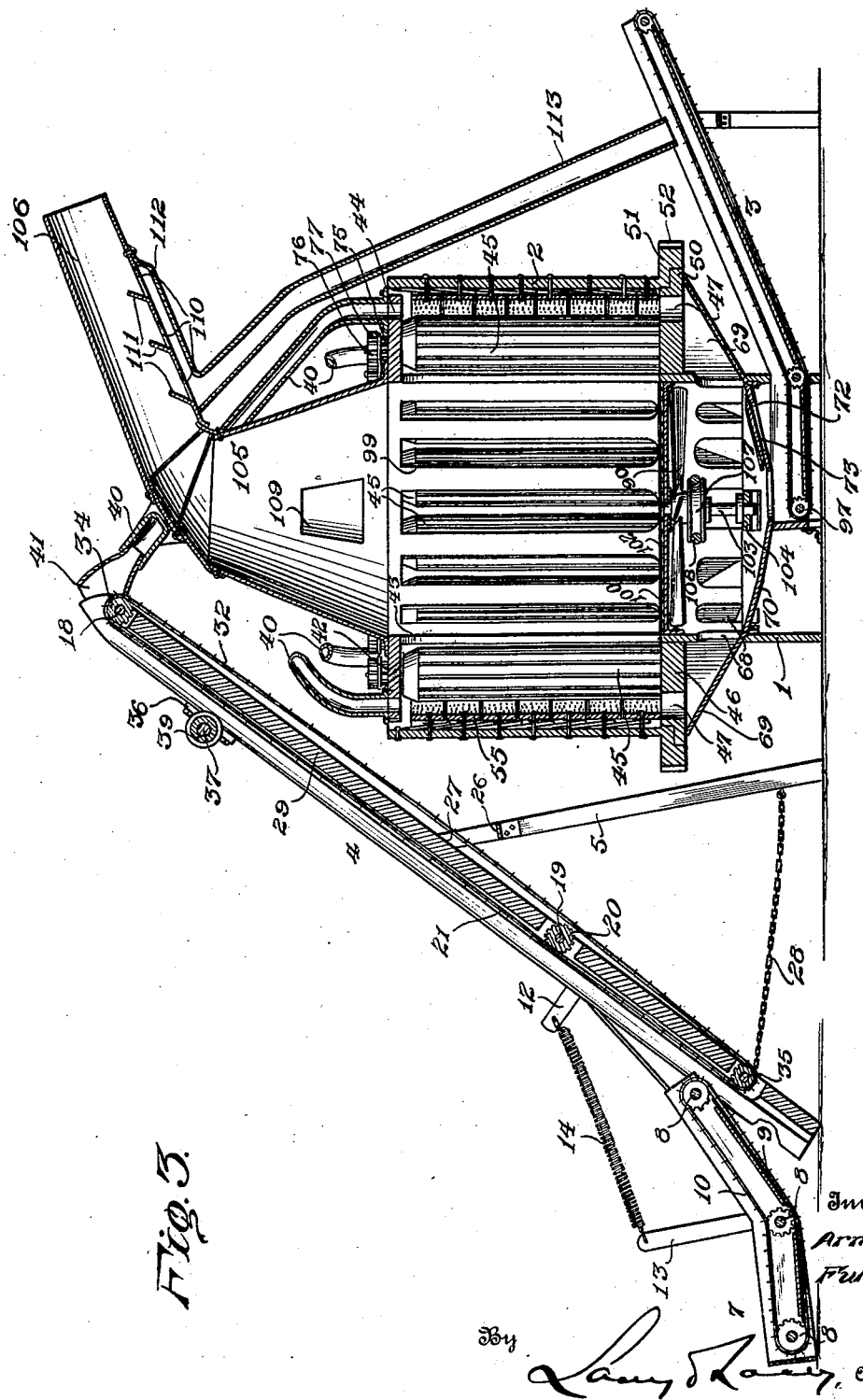

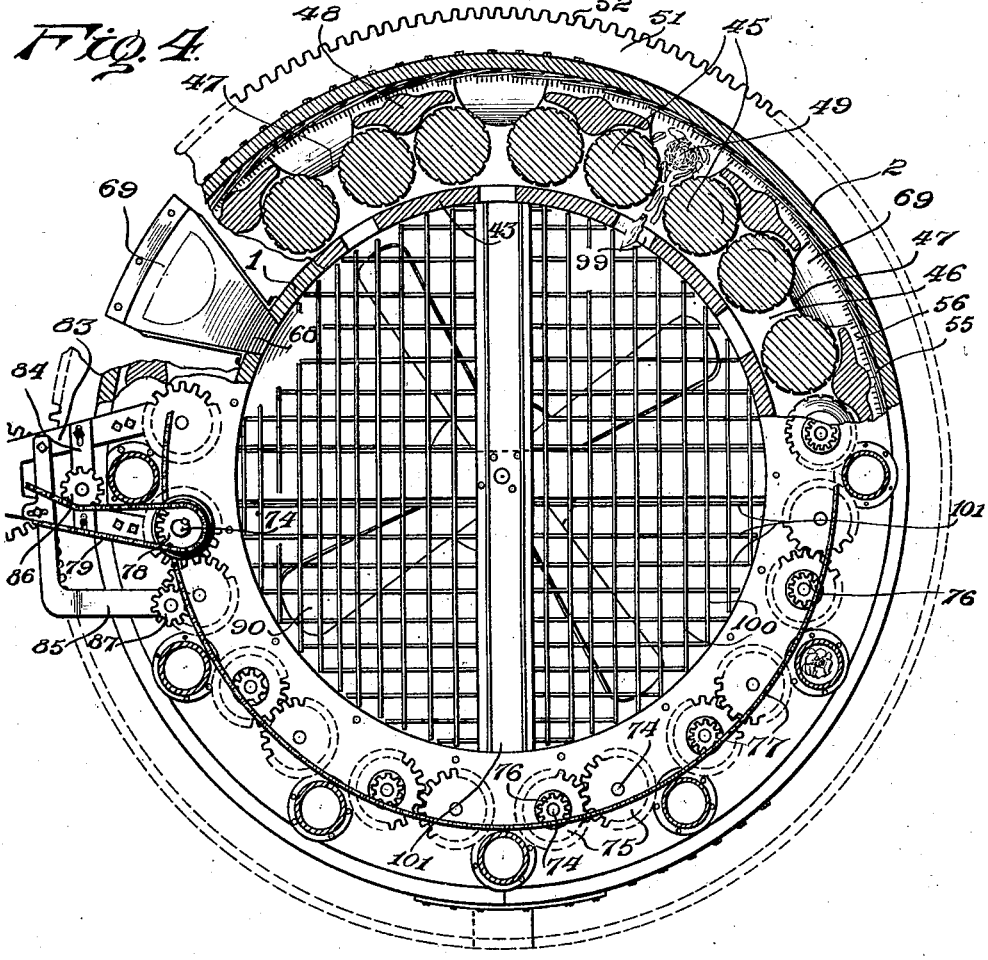

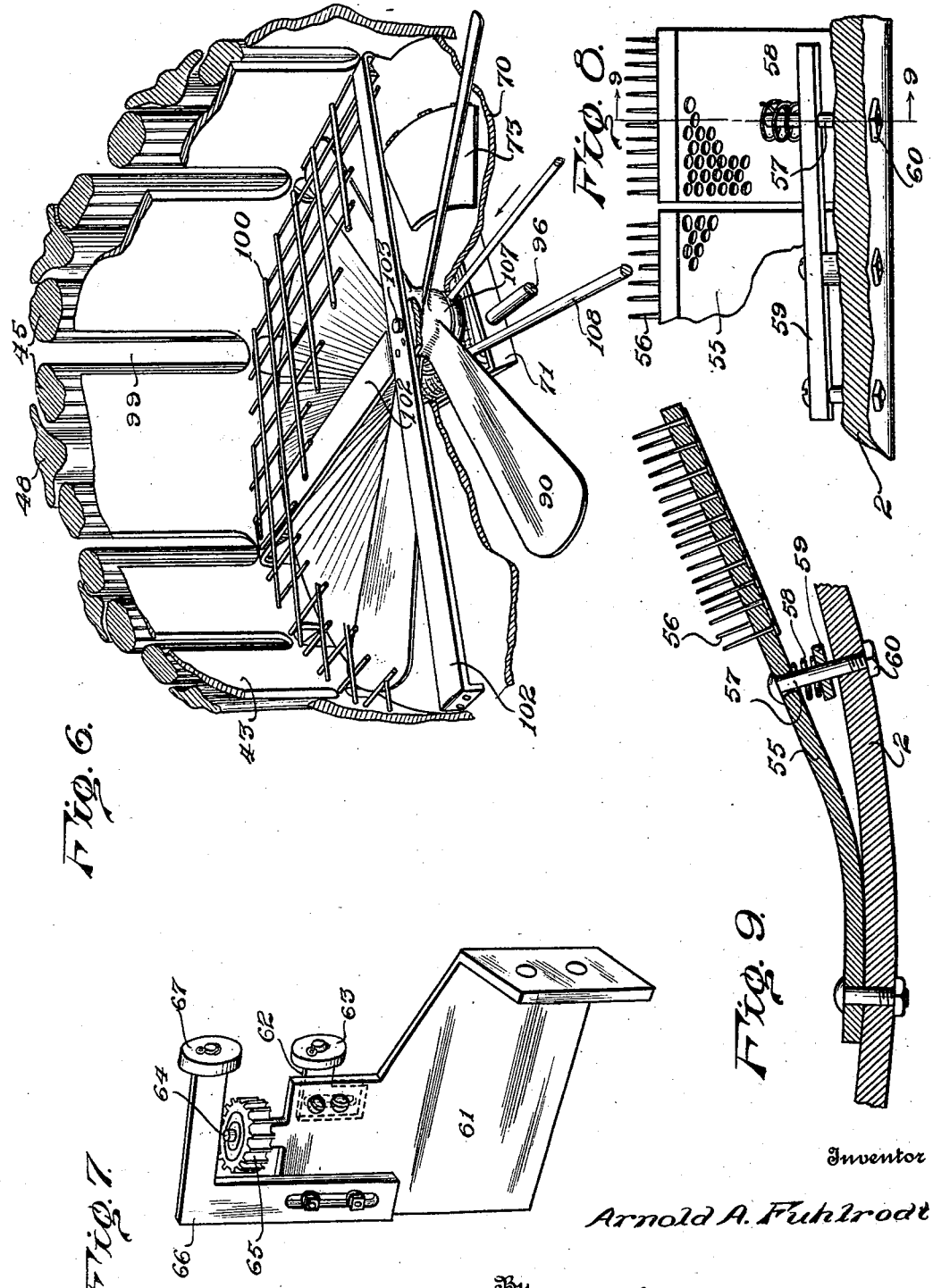

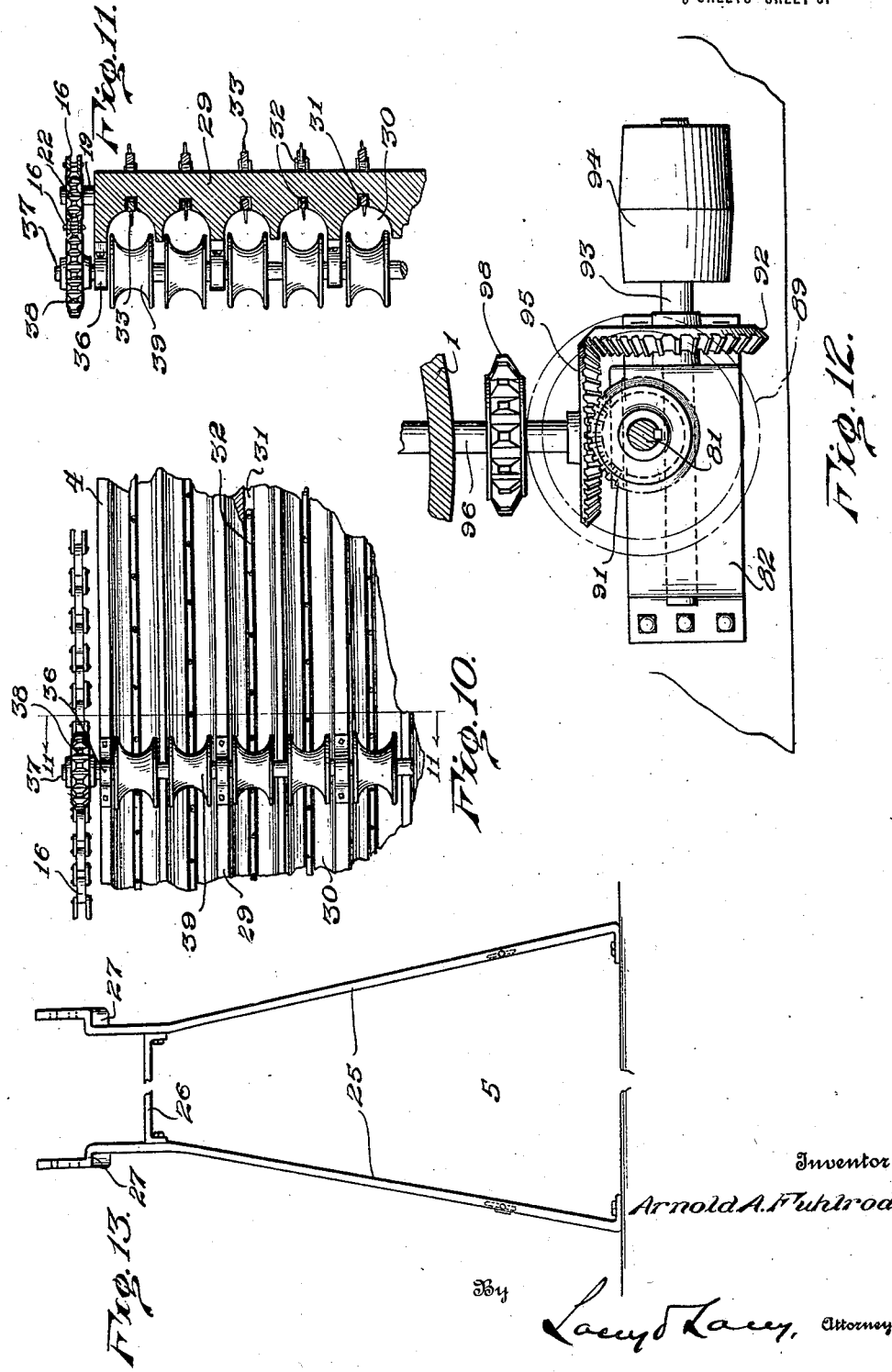

ARNOLD A. FUHLRODT, OF WISNER, NEBRASKA.

CORN-HUSKING MACHINE.

1,407,057.   Specification of Letters Patent.   Patented Feb. 21, 1922.

Application filed September 3, 1921. Serial No. 498,188.

*To all whom it may concern:*

Be it known that I, ARNOLD A. FUHLRODT, a citizen of the United States, residing at Wisner, in the county of Cuming and State of Nebraska, have invented certain new and useful Improvements in Corn-Husking Machines, of which the following is a specification.

This invention relates to corn huskers and has for its object the provision of an apparatus by the use of which the husks may be automatically removed from the ears of corn and the stripped ears delivered to a suitable receptacle. The invention includes novel means for removing the stripped husks from the machine and returning to the delivery mechanism any grains of corn which may be removed from the ears and carried out with the husks. The invention also includes novel means for delivering the corn endwise to the means for removing the husks and also includes novel means for guiding the stripped ears to the delivery mechanism. Other features of the invention will appear incidentally in the course of the following description. One embodiment of the invention is illustrated in the accompanying drawings and will be hereinafter fully set forth, the novel features being subsequently particularly pointed out in the appended claims.

In the drawings—

Figure 1 is a side elevation of an apparatus embodying the invention;

Fig. 2 is a plan view of the same;

Fig. 3 is a vertical longitudinal section;

Fig. 4 is a view partly in plan and partly in horizontal section;

Fig. 5 is an enlarged detail side elevation of a portion of the machine;

Fig. 6 is a detail perspective of the lower portions of some of the husking rolls and shows the means for driving the husks from the machine;

Fig. 7 is a detail perspective view of one of the supports and guides for the upper rotating cage;

Fig. 8 is an enlarged detail view of a portion of the husking means;

Fig. 9 is a section on the line 9—9 of Fig. 8;

Fig. 10 is an enlarged detail plan view of a portion of the means for feeding the corn to the husking mechanism;

Fig. 11 is a detail section on the line 11—11 of Fig. 10;

Fig. 12 is a detail view of a portion of the driving mechanism;

Fig. 13 is a detail view of the support for the corn-feeding elevator.

In carrying out my invention, I employ a stationary base or supporting frame 1 which may be erected upon any convenient platform and upon which is supported a rotatable shell 2. A delivery elevator or conveyor 3 extends from one side of the base or supporting frame and at the opposite side of the machine is a feeding elevator 4, and a conveyor 6 which receives the harvested corn for delivery onto the feeding elevator 4. The frames of the elevator 4 and conveyor 6 may normally rest upon the ground and the elevator may be propped in operative position by a frame 5. The conveyor 6 consists of side plates 7 by and between which are supported rollers or drums 8 over which is trained an endless apron or belt 9 having fingers 10 thereon, the roller or drum 8 at the delivery end of the conveyor having its shaft extended through the side plates 7 and journaled in bearings 11 upon the sides of the feeding elevator 4. The conveyor 6 is thus pivotally connected with the feeding elevator so that it may be folded over upon the same when the apparatus is not in use or is to be moved to another point, it being understood that the machine may be mounted upon a suitable truck or may be loaded onto a truck for transportation. A yoke 12 is secured to the frame of the feeding elevator 4 and a similar yoke 13 is mounted upon the frame of the conveyor 6, a spring 14 being extended between the said yokes to aid in lifting the conveyor when it is to be adjusted to a loaded wagon to receive therefrom the corn to be husked. Upon the shaft which constitutes the pivotal connection between the conveyor and the feeding elevator, I secure a sprocket wheel 15, around which a driving chain 16 is trained and the said chain also passes around a sprocket wheel 17 upon the end of the roller or drum 18 at the upper end of the feeding elevator. Intermediate the ends of the feeding elevator, a shaft 19 is journaled in the sides thereof and this shaft carries a drum or roller 20 which aids in supporting the working member of said elevator and also assists in propelling the same. Upon one end of the shaft 19 is a sprocket 22 which engages the driving chain 16 to actuate the same and upon the opposite end of said shaft 19 is a sprocket 23, around which is trained a chain 24 operatively connecting said shaft and sprocket with the main driving mechanism. The frame 5 may be of any preferred detail construction. As illustrated, it consists of a pair of standards 25 which converge upwardly and are connected near their upper ends by a cross bar or brace 26 extending beneath the feeding elevator. Above the said brace, the standards 25 are offset, as shown at 27, to provide shoulders which abut the lower edges of the side plates of the feeding elevator, the upper ends of the standards above said offsets or shoulders bearing against the said side plates. A chain or similar connection 28 is extended between the lower end of the feeding elevator and the lower portions of the standards 25 to prevent spreading and collapse of the structure while permitting the same to be adjusted to the lay of the ground.

The feeding elevator comprises a bottom board or base plate 29 which is secured to and extends between the side plates thereof and in the upper surface of this bottom board, I form a series of longitudinal channels or troughs 30 which extend from end to end of the board and serve as guides for the corn passing from the dumping conveyor 6 to the husking mechanism. In the bottom of each trough or channel 30 is a longitudinal groove 31, and conveyor chains 32 are arranged in these grooves, the said chains being equipped with pins or similar projections 33 adapted to engage the ears of corn and positively carry them to the upper end of the elevator. These chains 32 are trained around sprocket wheels 34 upon the upper drum or roller 18 and around similar sprocket wheels 35 at the lower end of the elevator so as to be positively driven. Upon the side plates of the elevator, near the upper ends thereof, I secure journal boxes 36 in which are mounted the ends of a shaft 37 equipped at one end with a sprocket 38 meshing with the upper run of the chain 16 and disposed above said chain so that the said sprocket and the shaft 37 will rotate in the opposite direction to the travel of the chains 32. Upon the shaft 37, between the side plates of the elevator, are secured a plurality of grooved rollers 39, each of said rollers being arranged directly over one of the troughs or channels 30, as clearly shown in Fig. 11. These rollers 39 act as barriers or a separator to prevent the corn passing in a mass to and over the upper end of the elevator and cause the ears to seat themselves longitudinally within the troughs or channels so that they are presented endwise to the upper end of the elevator. The ears, consequently, enter the several delivery tubes 40 endwise so that they will not be presented to the husking rollers crosswise and thereby clog the operation of the machine.

Supported in any convenient manner by the upper end of the feeding elevator are a series of funnels or hoppers 41 which have their upper ends arranged in alinement with the respective troughs or channels 30 and their lower ends fitted to the upper ends of the respective feeding tubes or conduits 40. Obviously, the hoppers and tubes or conduits correspond in number with the grooves or channels 30 and these conduits or tubes are preferably of some flexible material so that they may be bent to the proper shape to each deliver to a pair of husking rollers. The lower ends of the several tubes or conduits 40 are secured in a head plate 42 which is carried by a cage or plurality of standards 43 rising from the base 1 and rigid therewith, openings 44 being provided in the said head plate to permit the ears of corn to pass from the respective tubes or conduits to a pair of husking rollers 45. The husking rollers are each provided at its upper end with a journal or stub shaft which passes through and is rotatably mounted in the head 42 and at its lower end is provided with a similar journal which is rotatably mounted in a base or platform 46 extending laterally from the base 1, and openings 47 are provided through the said platform 46 to permit the passage of the stripped ears of corn. As shown most clearly in Fig. 4, the husking rollers are arranged in pairs around the entire machine and adjacent the husking rollers, but between the pairs of rollers, I provide guards 48 which prevent the ears of corn passing from one pair of rollers to the next pair and thereby hold the corn in proper position to be acted upon by the rollers constituting a working pair. These guards may be rotatably mounted rollers but are shown as stationary posts having wings or extensions whereby they effectually block the space between the husking rollers and the outer cage, thereby preventing the ears of corn from passing sidewise from the husking rollers. It will, of course, be readily understood that the husking rollers rotate in opposite directions and the ears of corn are delivered at the outer sides of the rollers, as indicated at 49 in Fig. 4, the husks being thus presented to the rollers in such position that they will be readily and positively engaged by the rollers and stripped from the corn. The peripheral edge of the platform or lower head 46 is recessed or channeled to provide a ledge 50 supporting the outer shell 2 and the said shell is provided at its lower end with a ring 51 provided with gear teeth 52 throughout its periphery. These gear teeth 52 are engaged by a suitable driving gear so that the shell will be rotated in the operation of the machine, as will be presently more fully set forth. The shell 2 and the gear ring 51 are preferably constructed in semi-circular or semi-cylindrical sections so that they may be readily assembled around the husking rolls and the inner mechanism of the apparatus, and the sections of the shell are firmly united after being placed in position by a coupling plate 53 which is bolted or otherwise secured to each section of the shell and bridges the joint between the same, as clearly shown in Fig. 5. These sections or members of the gear ring are constructed to form a spliced joint 54, as also shown in Fig. 5. Upon the inner surface of the shell 2, I provide a plurality of strippers each consisting of a somewhat resilient plate 55 secured at one end to the shell and having its opposite end free of the shell and projecting therefrom toward the husking rollers. The said free end of this stripper plate is provided with a plurality of pins or teeth 56 of any desired formation, and a tension bolt 57 is fitted in the plate and extends therefrom outwardly through the shell, as clearly shown in Fig. 9. A spring 58 is coiled around each bolt 57 between the stripper plate 55 and an abutment bar 59 which is secured to the shell 2, and the tension of the said spring 58 is regulated by adjusting the nut 60 on the outer end of the bolt. It will be readily understood that by turning the nut home against the shell, the bolt will be drawn outwardly and the tension of the spring increased so that the stripper plate will be drawn closer to the shell but will be yieldably supported at all times. By this arrangement, I am enabled to adjust the stripper plates to the size of the corn being husked, the stripper plates being permitted to lie closer to the husking rollers when smaller corn is passing through the apparatus. It will be readily noted that the stripper plates 55 are arranged in such numbers as to cover the entire inner surface of the shell 2, the free end of one plate overlying the secured end of an adjacent plate so that the pins or teeth 56 will form an uninterrupted surface to engage the husks of the corn fed into the mechanism. The shell is constantly rotated during the operation of the machine and the teeth 56 are thereby caused to engage the husks and rotate the ears in co-operation with the engagement of the husks by the rollers 55 so that the husks will be firmly gripped and positively stripped clean of the cobs and kernels. To aid in supporting the shell and to maintain an even steady motion of the same during the operation of the apparatus, I provide a plurality of standards 61 which are arranged at equidistant points around the machine and are secured to the base 1, as clearly shown in Fig. 1. Adjacent the upper end of each standard 61 is an arm or bracket 62 which projects laterally inwardly therefrom under the gear ring 51 and carries a roller 63 bearing against the under side of said ring so as to support the same, as will be readily understood. The bracket or arm 62 is, of course, vertically adjustable upon the standard 61 so as to compensate for wear and permit the rollers 63 to firmly support the ring 51 without binding unduly against the same. At the upper end of the standard 61 and arranged outwardly beyond the bracket 62 is a vertically disposed spindle 64 upon which is fitted an idler gear 65 adapted to mesh with the gear teeth 52 of the ring 51 so as to counteract any tendency of the shell toward horizontal displacement. I also secure to the upper end of the standard 61 at the upper edge thereof, a bracket 66 which rises from the standard and then extends inwardly to overhang the ring 51 and this bracket carries a roller 67 which is adapted to run upon the upper surface of the ring 51. It will thus be seen that I effectually guard against both vertical and horizontal displacement of the shell so that it will be maintained in concentric relation to the husking rollers at all times while permitting the shell to rotate easily and evenly.

Openings 68 are formed through the base 1, as shown clearly in Fig. 3, immediately below the platform or lower head 46 and chutes 69 are secured to the base and to the under side of said platform or head around the entire base so that the ears of corn passing through the several openings 47 will be directed through the openings 68 onto a pan or hopper 70 within the base. This hopper or pan 70 delivers the corn onto the delivery carrier 3 which has a lower horizontally disposed portion within the base and an upwardly inclined portion at the outer side of the base which may extend to any desired point so that the husked corn may be delivered into a vehicle or deposited within a storehouse or bin, the frame of this conveyor extending through the base 1, as clearly shown in Fig. 3. The chutes 69 consist of side walls of triangular form fitting closely to the base 1 and the under side of the platform or head 46, as clearly shown in Fig. 3, and an inclined bottom extending between the lower edges of the side plates so that the ears of corn will be guided positively through the openings 68 onto the pan 70 and none of the corn will be lost. Obviously, these chutes may be conveniently stamped from sheet metal and readily secured in place in any convenient manner. They should form a continuous system around the entire base so that each opening 47 will be directly connected with an opening 68 and no space left through which the corn might be lost. Each chute and the pan may be provided with an opening, such as indicated at 72, covered normally by a flap or door 73 to permit access to the interior of the machine when cleaning or repairing may be necessary.

The stud or shaft 74 at the upper end of each husking roller carries a pinion 75 which meshes with the similar pinion at the upper end of the coacting roller, and it will be readily understood that these pinions 75 are arranged above the head plate 42. The shaft 74 of one roller of each pair of rollers is extended above the pinnion 75 and carries a sprocket 76 which meshes with a chain 77 extending around the entire machine so that all the rollers will be positively actuated. One shaft 74 is extended above the sprocket 76 and is equipped with a second sprocket 78 around which is trained the driving chain 79 which is also trained around a sprocket 80 on the upper end of a vertical shaft 81 disposed laterally beyond the shell 2 and supported at its lower end in a bracket or frame 82 and at its upper end in a bracket 83 which is secured to and projects laterally from the upper head 42. The bracket 83 carries chain tighteners 84 and 85, the idler sprockets 86 and 87 of which mesh, respectively, with the driving chain 79 and the chain 77 so as to compensate for wear upon the same and keep them in the proper taut condition for successful operation. The shaft 81 constitutes the main transmission shaft by which power is applied to the machine. A gear wheel 88 is secured to the said shaft in the horizontal plane of the ring 51 and meshes with the teeth 52 on said ring so as to drive the same and the shell 2, as will be readily understood, and below the said gear a pulley 89 is secured to said shaft to drive the fan 90, as will be presently more fully set forth. At the lower end of the shaft 81 is a beveled gear 91 which is near the beveled gear 92 on the main driving shaft 93 which carries fast and loose pulleys, indicated at 94, whereby power may be transmitted to the machine from any convenient motor. The beveled gear 91 and the main driving beveled gear 92 both mesh with a beveled gear 95 upon the outer end of a shaft 96 which extends through the base 1 and carries the innermost drum 97 of the conveyor 3, the rotation of the shaft 96 obviously rotating said drum 97 and imparting motion to the said conveyor. Upon reference to Figs. 1 and 12, it will be noted that the gear 91 is smaller than the gears 95 and 92 and the said gears are so arranged that any two of them are at right angles to each other, the power being transmitted by the gear 92 directly to the gear 95 and through the latter to the gear 91. A sprocket 98 is secured upon the shaft 96 and the chain 24 is trained around the said sprocket so that the feeding elevator and the dumping conveyor will both be driven from the said shaft.

The husks, as they are stripped from the corn by the rollers 45, will be fed through the openings 99 in the inner shell or the spaces between the standards 43 and will fall onto the reticulated bottom 100 of the inner shell. This reticulated bottom may be formed of intersecting spaced rods 101 or of a coarse mesh fabric and immediately below the said reticulated bottom, I secure the cross bars 102 which form the upper support for the fan shaft 103, the lower end of said shaft being supported in a bracket or cross bar 104 extending over the pan 70. The fan 90 may be of any well-known form and is secured to the fan shaft immediately beneath the reticulated bottom 100 so that it will act directly upon the husks falling onto said bottom and drive the same up and out of the inner casing or shell through a hood 105 and an outlet spout 106. Immediately below the fan, a pulley 107 is secured upon the fan shaft and a belt 108 is trained around the said pulley and the pulley 89 upon the shaft 81. The hood 105 may be formed of any light sufficiently rigid material and is in the form of a truncated cone secured upon the head 42 and covering the entire upper end of the inner shell or case. The spout 106 leads laterally from the upper end of the hood and the hood may be provided with a manhole 109 to permit access to the interior of the apparatus when inspection or repairing may be desirable. The spout 106 is preferably inclined somewhat upwardly, as clearly shown in Figs. 1 and 3, and in the under side of the spout near the junction of the same with the hood, I provide a plurality of transverse slots 110 formed by striking up tongues 111 from the material of the spout. It may sometimes happen that some kernels will be shelled from the cobs during the husking operation and will be delivered to the interior of the inner shell with the husks. These kernels will, of course, be driven upwardly and outwardly by the action of the fan blast, but as they are heavier than the husks, they will drop to the bottom of the spout and gravitate to the slots 110 through which they will drop and be caught by a shallow pan or trough 112 secured upon the under side of the spout and extending under all the slots 110. From the lower end of the pan or trough 112, a spout 113 extends downwardly and terminates over the delivery portion of the conveyor 3, as shown most clearly in Fig. 3. The loose kernels will be thereby delivered to the wagon or bin with the ears of corn and loss of the loose kernels will be thereby prevented.

From the foregoing description, taken in connection with the accompanying drawings, it will be readily seen that I have provided a machine by the use of which a large quantity of corn may be expeditiously stripped of the husks and the husks and corn delivered at separate points. The husks may be directed onto a stack and utilized for fodder, while the kernels, whether loose or on the cob, will be delivered into the desired receptacle with the minimum outlay of time and labor.

Having thus described the invention, what is claimed as new is:

1. The combination of vertically disposed husking mechanism, means for delivering ears of corn endwise to the upper end of said husking mechanism, means for discharging the husks at the top of said husking mechanism, and means for discharging the stripped corn at the bottom of said husking mechanism.

2. The combination of vertically disposed husking mechanism, means for delivering ears of corn to the upper end of said husking mechanism, means for discharging the husks at the top of the husking mechanism, means for discharging the stripped ears at the bottom of the husking mechanism, and means external to the husking mechanism for separating loose kernels from the husks and delivering the loose kernels to the means for discharging the stripped ears.

3. The combination of a feeding elevator comprising a plurality of longitudinal troughs and lifting means traveling in the bottoms of the several troughs, means disposed over the troughs for separating ears of corn and depositing them longitudinally in the troughs, a plurality of conduits leading from the delivering ends of the several troughs and arranged to receive ears of corn therefrom endwise, and husking mechanism receiving the ears of corn from said conduits.

4. The combination of a feeding elevator comprising a plurality of parallel troughs and feeding means traveling in the bottoms of the troughs, a plurality of grooved rollers arranged transversely to and above the respective troughs whereby to separate ears of corn and deposit them longitudinally in the troughs, husking mechanism, and a plurality of conduits leading from the delivery ends of the respective troughs to the husking mechanism.

5. The combination of a feeding elevator comprising a plurality of parallel troughs and feeding means traveling in the bottoms of the respective troughs, a plurality of grooved rollers arranged transversely to and over the respective troughs, means for rotating said rollers in opposition to the direction of travel of the feeding means, a husking mechanism comprising a plurality of pairs of vertically disposed husking rollers, and a plurality of conduits each arranged to receive ears of corn endwise from one of the troughs and deliver the same to the upper end of a pair of husking rollers.

6. The combination of concentric shells, vertically disposed husking rollers arranged between the shells, means for delivering ears of corn at the upper ends of the husking rollers between the same and the outer shell, means for rotating the husking rollers whereby the husks will be stripped from the corn and delivered to the interior of the inner shell, a hood over the upper end of the inner shell, a discharge spout leading from the upper end of said hood, and means for driving the husks through said hood and said spout.

7. The combination of inner and outer shells, vertically disposed pairs of husking rollers supported by the inner shell and between the two shells, means for delivering ears of corn at the upper ends of the husking rollers between the same and the outer shell, means for rotating the outer shell about the inner shell and the husking rollers, means carried by the outer shell to engage the ears of corn and effect rotation of the same, means for rotating the husking rollers whereby the husks will be stripped from the ears of corn and delivered to the interior of the inner shell, means for discharging the husks through the upper end of the inner shell, and means for removing the stripped ears of corn from below said shell.

8. The combination of inner and outer shells, vertically disposed pairs of husking rollers arranged between the shells and supported by the inner shell, means for delivering ears of corn at the upper ends of the husking rollers between the same and the outer shell, means for rotating the husking rollers whereby the husks will be stripped from the ears of corn and delivered into the inner shell, a reticulated bottom for the inner shell, and a blower disposed below said reticulated bottom and operable to discharge the husks through the upper end of the shell.

9. The combination of inner and outer shells, means disposed between the shells for removing husks from ears of corn and delivering the husks to the interior of the inner shell and delivering the stripped ears of corn below said shell, means for delivering ears of corn at the upper ends of said last-mentioned means, means for removing the stripped ears of corn from below the inner shell, a discharge spout over the inner shell provided with openings in its bottom, baffles at the front of said openings, a receiver on said spout below said openings, and means for driving the husks from the inner shell through said spout.

10. The combination of inner and outer shells, husking mechanism supported by the inner shell between the two shells and arranged to remove husks from ears of corn and deliver said husks into the inner shell, means for delivering ears of corn at the said husking mechanism, means at the bottom of the shell to receive the stripped ears of corn, a conveyor leading laterally from said means, a discharge spout in communication with the top of the inner shell, means for driving the husks from the shell through said spout, a receiver on the bottom of said spout, means in the spout to reclaim loose kernels of corn and deliver the same into said receiver, and means for discharging said loose kernels from said receiver onto the conveyor leading from the bottom of the shell.

11. The combination of inner and outer shells, husking mechanism mounted between the two shells, means for delivering ears of corn at the top of the husking mechanism, a pan below the shells concentric therewith and arranged to receive stripped ears of corn from the husking mechanism, a conveyor disposed below said pan and extending laterally beyond the shells and receiving the ears of corn from said pan, and means for discharging the husks from the upper end of the inner shell.

12. The combination of inner and outer shells, husking mechanism supported by the inner shell and arranged between the two shells, means for delivering ears of corn at the top of the husking mechanism, a pan below the inner shell, a series of chutes extending from the bottom of the husking mechanism to said pan to deliver stripped ears of corn into said pan, means for conveying the ears of corn from said pan, and means for discharging the husks from the top of the inner shell.

13. The combination of a plurality of pairs of husking rollers arranged in circular relation, a shell surrounding said husking rollers, means on said shell for engaging ears of corn and rotating the same in engagement with the husking rollers, means for rotating said shell about the series of rollers, means for independently rotating the husking rollers, means for discharging the stripped ears of corn at the lower ends of the husking rollers, and means for discharging the husks upwardly from within the circular series of husking rollers.

14. The combination of a plurality of pairs of vertically disposed husking rollers, means for rotating the rollers of each pair of rollers in opposite directions, a circular shell arranged around the plurality of rollers, strippers carried by the inner side of said shell, and means for rotating said shell around the rollers.

15. The combination of a circular series of pairs of vertically disposed husking rollers, means for rotating the rollers of each pair of rollers toward each other, a shell surrounding the circular series of rollers, yieldable strippers on the inner side of said shell, and means for rotating said shell about the series of rollers.

16. The combination of a circular series of pairs of vertically disposed husking rollers, means for rotating the rollers of each pair toward each other, a shell enclosing the series of rollers, a plurality of resilient stripper plates secured on the inner side of the said shell, teeth at the free ends of the several stripper plates arranged to engage the husks of ears of corn delivered between them and the husking rollers, means for adjusting the tension of the stripper plates, and means for rotating the shell about the series of husking rollers.

17. The combination of a plurality of pairs of vertically disposed husking rollers, means for actuating said rollers, a shell surrounding the rollers, strippers on the inner side of said shell, a horizontally disposed gear ring fixed to the lower end of the shell, means engaging said gear ring to rotate the shell about the husking rollers, a plurality of standards disposed below the said shell, a supporting roller on each of said standards bearing against the under side of said gear ring, a co-operating roller carried by each standard and bearing upon the upper side of the gear ring, and an idler pinion on each standard between said rollers meshing with the gear ring.

18. The combination of a plurality of pairs of vertically disposed husking rollers, a circular shell surrounding the plurality of rollers, means for rotating the shell, means for operating the rollers, and means on the shell for rotating ears of corn fed between the shell and the rollers whereby the husks will be stripped from the corn and discharged between the rollers.

In testimony whereof I affix my signature.

ARNOLD A. FUHLRODT. [L. S.]